No. 664,329. Patented Dec. 18, 1900.
H. E. LOYSTER.
PROCESS OF PURIFYING CREAM OR OTHER LIQUIDS.
(Application filed Dec. 9, 1899.)
(No Model.)
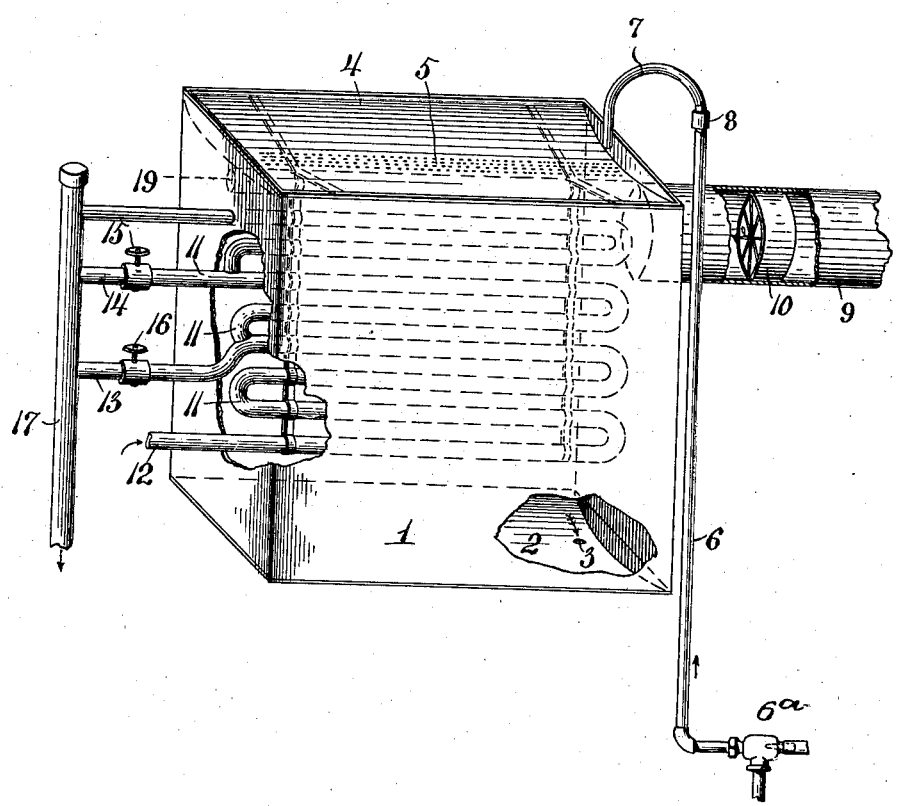
WITNESSES
INVENTOR
Herbert E. Loyster.
by Knight Bros
Attorneys

UNITED STATES PATENT OFFICE.

HERBERT E. LOYSTER, OF HUDSON, MICHIGAN, ASSIGNOR TO JENNIE M. LOYSTER, OF SAME PLACE.

PROCESS OF PURIFYING CREAM OR OTHER LIQUIDS.

SPECIFICATION forming part of Letters Patent No. 664,329, dated December 18, 1900.

Application filed December 9, 1899. Serial No. 739,835. (No specimens.)

*To all whom it may concern:*

Be it known that I, HERBERT E. LOYSTER, a citizen of the United States, and a resident of Hudson, in the county of Lenawee and State of Michigan, have invented certain new and useful Improvements in Processes of Purifying Cream or other Liquids, of which the following is a specification.

My invention relates to a process for purifying cream; and it consists in delivering the cream to a perforated pan, preferably by means of a steam pump or jet, which simultaneously elevates and heats the cream, then permitting the cream to drop from the perforations of said pan through a blast of air upon a spreading coil or coils located in the path of the blast of air, and thence upon a series of coils containing running water for cooling it, the extent of the cooling-coils being variable at will, and the effect of the whole process being to raise the cream to animal temperature to throw off all impurities from the cream while at animal temperature and deliver the cream at normal temperature.

The figure in the drawing illustrates an apparatus by means of which this process is carried out.

The apparatus consists of a rectangular chamber 1, suitably supported and provided with a concave bottom 2, having the opening 3.

4 is a vat having a concave bottom secured upon the top of the receptacle 1 and provided with a series of perforations 5 through the bottom thereof.

6 is a pipe leading from the vat containing cream and connected with a suitable steam pump or jet 6ª, by means of which the cream is heated and elevated in said pipe and discharged into the pan 4 from the nozzle 7, which is secured to said pipe by means of a union 8.

9 is an air-duct opening into the box or receptacle 1, near the top and immediately under the pan or vat 4, said duct being provided with a suitable blast-fan 10.

11 represents coils of pipe secured within the box or receptacle 1 in line with the perforations 5 in the pan or vat 4, and 12 is a supply-pipe by means of which water is fed into said coils.

13 and 14 are discharge outlets or pipes leading from the coils 11 at different elevations and provided with suitable valves 15 and 16, said discharge-pipes 13 and 14 leading into a common waste-pipe 17.

19 is a tin drum or tube secured in line with the perforations 5 in the vat 4 and in line with the air-blast above the coils 11, said drum or tube being disconnected from the coils 11, from which it will be understood that the drum or tube 19 is not a cooler.

In large creameries the supply is gathered from various sources and poured into a common vat. (Not shown in the drawing.) From this vat the cream is raised from the first floor of the building to the second floor through the pipe 6 by means of a steam pump or jet, thereby heating the cream to about animal heat, thus heating and elevating the cream at the same time or simultaneously. The cream is then discharged from the nozzle 7 into the pan or vat 4, from which it runs through the perforations 5 into the box or receptacle 1 and strikes upon the drum or tube 19, by means of which it is divided into very thin sheets or spray, through which the blast of cold air from the fan 10 passes, thus separating the foreign odors from the cream, the cream continuing to drop onto the coils 11, which contain cold running water, thereby again cooling the cream. The cream falls from the cooling-coils onto the concave bottom of the receptacle 1, from whence it discharges through the opening 3 to a suitable receiving-vat. (Not shown in the drawing.)

It has been demonstrated that it is necessary to heat the cream to about animal heat in order to separate the foreign odors from the same.

From the above it will be seen that the cream is agitated by means of the drum or tube 19, while the blast of cold air passes through it.

It will be observed that the cream in discharging from the pan 4 through the perforations 5 is divided into fine streams, which when they strike the separating or agitating coils 11 are further divided, whereby the cream is thoroughly divided into minute bodies, through and around which the blast of cold air passes.

This process and the machine for carrying it out may be with equal facility used in making what is known as "process butter," said process butter being made by mixing butter and milk and making an emulsion. This emulsion is acted upon by the process above described, which purifies it by taking out all bad odors from the butter and milk mixed together, thereby making a very fine process butter, and for the purpose of this invention such an emulsion is to be considered as cream.

Having thus described my invention, the following is what I claim and desire to secure by Letters Patent:

1. The continuous process of purifying cream which consists in heating the cream and dividing it into streams, introducing a blast of fresh air at normal temperature through and around the finely-divided cream, and cooling the cream.

2. The process of purifying cream which consists in heating the cream to animal temperature, dividing it into streams, and subjecting the streams at such temperature to a blast of fresh air at normal temperature for removing odors and impurities, and then cooling the cream to normal temperature.

HERBERT E. LOYSTER.

Witnesses:
G. I. THOMPSON,
C. C. WHITNEY.